United States Patent [19]
Pavan

[11] Patent Number: 6,096,423
[45] Date of Patent: Aug. 1, 2000

[54] SURFACE-TREATED METAL COMPONENT FOR REINFORCING STRUCTURES FOR MANUFACTURED PRODUCTS MADE OF ELASTOMERIC MATERIAL AND AN ARTICLE OF MANUFACTURE COMPRISING THE SAME

[75] Inventor: Federico Pavan, Florence, Italy

[73] Assignee: Pirelli Pneumatici S.p.A., Milan, Italy

[21] Appl. No.: 09/276,832

[22] Filed: Mar. 26, 1999

Related U.S. Application Data

[60] Provisional application No. 60/091,536, Jul. 1, 1998.

[30] Foreign Application Priority Data

Mar. 27, 1998 [EP] European Pat. Off. ............. 98830183

[51] Int. Cl.$^7$ .................................................... B32B 19/00
[52] U.S. Cl. .......................... 428/379; 428/370; 428/381; 428/461; 428/465; 525/346; 524/349; 156/124; 152/564
[58] Field of Search ..................................... 428/364, 375, 428/379, 381, 461, 465; 525/346; 524/349; 156/124, 564

[56] References Cited

U.S. PATENT DOCUMENTS 5,356,711 10/1994 Garro et al. .

FOREIGN PATENT DOCUMENTS

| | | |
|---|---|---|
| 0 669 409 | 8/1995 | European Pat. Off. . |
| 0 694 631 | 1/1996 | European Pat. Off. . |
| 2 413 228 | 7/1979 | France . |
| 2 426 562 | 12/1979 | France . |

OTHER PUBLICATIONS

Minato Akira, "Galvanized and Zinc Alloy Electroplated Steel Sheet and Its Manufacture", Patent Abstracts of Japan, JP 61 034194, Feb. 18, 1996 (Abstract Only).

K. Ariga et al., "A Consideration on the Corrosion Resistance of Zinc–Cobalt based Cobalt–Electrogalvanized Steel Sheet", Chemical Abstracts, Abstract No. 93: 153972, XP002081559, Oct. 20, 1980 (Abstract Only).

*Primary Examiner*—Richard Weisberger
*Attorney, Agent, or Firm*—Finnegan, Henderson, Farabow, Garrett & Dunner, L.L.P.

[57] ABSTRACT

A surface-treated metal component for reinforcing structures for manufactured products made of vulcanized elastomeric material, in which the said component is coated with a layer of metal alloy and in which the said alloy is an alloy ZnMoX in which X is a metal chosen from the group comprising cobalt, iron and nickel.

26 Claims, 3 Drawing Sheets

SURFACE-TREATED METAL COMPONENT FOR REINFORCING STRUCTURES FOR MANUFACTURED PRODUCTS MADE OF ELASTOMERIC MATERIAL AND AN ARTICLE OF MANUFACTURE COMPRISING THE SAME

This application is based on European Patent Application No. 98830183.4 filed on Mar. 27, 1998 and U.S. provisional application Ser. No. 60/091,536 filed on Jul. 1, 1998, the content of which is incorporated hereinto by reference.

The present invention relates to a surface-treated metal component for reinforcing structures for manufactured products made of elastomeric material, which is surface-coated with a metal alloy and an article of manufacture comprising said metal component buried in a vulcanized elastomeric material.

More specifically, the present invention relates to a surface-treated steel component for reinforcing structures for manufactured products made of elastomeric material, which is surface-coated with an alloy comprising zinc (Zn) and molybdenum (Mo).

The present invention also relates to a reinforcing structure comprising the said component, to a manufactured product made of vulcanized elastomeric material comprising the said component and/or the said reinforcing structure, and to a process for coating the said component with the said alloy.

It is known that certain manufactured products made of vulcanized elastomeric material are reinforced by embedding suitable metal structures within an elastomeric matrix. Generally, the said metal structure is made of steel cords and/or wires.

It is also known that, on account of its excellent mechanical properties, the metal of choice for the said structure is steel. However, its chemical properties are not excellent since they do not ensure good adhesion to the vulcanized elastomeric material and they impart poor corrosion resistance.

It is thus necesary to coat the steel component with a metal or a metal alloy so as to give this steel corrosion-resistance and ensure good adhesion to the vulcanized elastomeric material.

Moreover, given that, once coated, the abovementioned steel wires are subjected to a drawing process which is carried out several times until the desired dimensions of the wire are obtained, the coating on the steel component should not interfere with the drawing process or cause any appreciable deterioration to the wire.

The choice of the most suitable coating is also conditioned by the fact that this coating can be applied by a simple, cost-effective and clean technique, such as electrodeposition.

An alloy which has been used for a long time for coating steel wires for reinforcing manufactured products made of vulcanized elastomeric material, is brass (copper/zinc alloy with about 70% copper (Cu) and 30% zinc).

In this case the adhesion is promoted thanks to the formation of a thin layer of copper sulphide $Cu_xS$ by the sulphur itself or by known derivatives thereof present in the mixture as vulcanizing agents.

Even though, brass coated steel well adheres to a vulcanized elastomeric matrix, said adhesion decays in time because of the action of humidity/oxigen. Indeed in articles made of a vulcanized elastomeric material reinforced by brass coated steel wires optionally in the form of cords, such as, for example, tires, corrosion is caused both by humidity, which permeates the elastomer, and by water which comes into contact with the reinforcing structure made of brass coated steel through holes or tears in the elastomer.

Said brass/elastomer adhesion failure may be partially opposed by adding some cobalt in the form of a salt (U.S. Pat No. 5,356,711). It is believed that cobalt reduces the electrical conductivity of the layer of copper sulphide; this would slow the diffusion rate of $Zn^{++}$ ions and, as a consequence, reduce the growing rate of the $ZnO/Zn(OH)_2$ interface layer which is responsible for the destruction of the $Cu_xS$ film and thus for the adhesion.

However, the resulting octonate steel suffers the drawbacks characteristically associated with copper, i.e. rapid degradation both of the adhesion to the vulcanized elastomeric material and of the corrosion protection.

Ternary alloys formed of brass (Cu/Zn) and a third metal such as, for example, cobalt (Co) or manganese (Mn) have therefore been proposed.

French Patent FR 2,413,228 and FR 2,426,562 disclose a metal wire coated with a ternary alloy composed of brass and cobalt, with a cobalt content of between 0.5 and 30% by weight.

The abovementioned ternary alloys have proved to have greater corrosion resistance and to be capable of adhering to the vulcanized elastomeric material over time, but such enhancements were still unsatisfactory on account of the presence of copper.

Research was thus carried out into alloys which would not contain copper and which would also possess the desired properties of adhesion to the vulcanized elastomeric material, corrosion resistance and draw ability. Binary zinc alloys were thus tested.

Application EP-A-0,694,631 describes a metal wire coated with a binary alloy composed of zinc and manganese, with a manganese content of between 5 and 80% by weight.

Application EP-A-0,669,409 describes a metal wire coated with a binary alloy composed of zinc and cobalt, with a cobalt content of less than 1% by weight.

Although they demonstrate better corrosion resistance than the above-mentioned ternary alloys, the abovementioned binary alloys do not offer significant improvements as regards adhesion.

Therefore, still there is a need to comply concurrently with both the requirements of a good resistance of the wire to corrosion and a good adhesion of the wire to a vulcanized elastomeric matrix.

It has now been found, surprisingly, that a ZnMoX ternary alloy has a draw ability, a corrosion-resistance and an adhesion to the vulcanized elastomeric material after age-hardening which are better than those afforded by brass, zinc alone or the Zn/Mn and Zn/Co binary alloys described in European patent applications Nos EP 694,631 and EP 669,409.

In a first aspect, the present invention thus relates to a surface-treated metal component for reinforcing structures for manufactured products made of vulcanized elastomeric material, in which the said component is coated with a layer of metal alloy, and is characterized in that the said alloy is an alloy ZnMoX in which X is a metal chosen from the group comprising cobalt, iron and nickel.

The molybdenum content in the alloy of the present invention is preferably of from 0.05 to 3% by weight, even more preferably of from 0.1 to 1% by weight.

The zinc content in the alloy of the present invention is preferably of from 95 to 99.9% by weight, even more preferably of from 98 to 99.5% by weight.

The content of the third metal is preferably of from 0.05 to 2% by weight, even more preferably of from 0.1 to 1% by weight.

Typically, the said surface coating layer is formed by electrodeposition on the surface of the said steel wire.

The thickness of the said coating layer on the steel wire, before drawing, is preferably of from 1 to 4 microns. However, after drawing, this thickness is typically of from 0.1 to 0.4 micron.

Preferred examples of zinc salts which are suitable for carrying out the electrodeposition process according to the invention are those chosen from the group comprising sulphate, sulphamate, hypophosphite, picrate, selenate and thiocyanate. Even more preferably, these are sulphate and sulphamate.

Preferred examples of molybdenum salts which are suitable for carrying out the electrodeposition process according to the invention are those chosen from the group comprising tetrabromide, oxydibromide, oxytetrachloride, oxydichloride, oxypentachloride, oxytetrafluoride, metaphosphate, phosphide and ammoniacal complexes. Even more preferably, the molybdenum salt is the ammoniacal complex of empirical formula $(NH_4)_6Mo_7O_{24}\cdot 4H_2O$.

Preferred examples of cobalt salts which are suitable for carrying out the electrodeposition process according to the invention are those chosen from the group comprising divalent cobalt iodate, fluorides or chlorides and divalent cobalt thiocyanate and sulphates. Even more preferably, the cobalt salt is divalent cobalt sulphate.

In a second aspect, the present invention relates to a process for the electrolytic deposition of an alloy ZnMoX, in which X is a metal chosen from the group comprising cobalt, iron and nickel, onto a steel wire passing through an electrolytic bath, characterized in that the said steel wire is passed through an electrolytic bath consisting of an aqueous solution of at least one salt chosen from zinc and molybdenum salts, the said electrolytic bath having:

a temperature of from 20 to 50° C.;

a pH of from 2 to 6; and a cathode density of from 10 to 50 $A/dm^2$.

Typically, the throughput speed of the said wire is of from 10 to 70 m/min, and even more typically of from 20 to 50 m/min.

Typically, the zinc salt used in the process of the present invention is a sulphate. Even more typically, the zinc sulphate is zinc sulphate heptahydrate.

Typically, the molybdenum salt used in the process of the present invention is an ammoniacal complex. Even more typically, it is the ammoniacal molybdenum complex $(NH_4)_6Mo_7O_{24}\cdot 4H_2O$.

In a preferred embodiment of the process of the present invention, the steel wire is immersed in an electrolytic bath comprising a molybdenum salt, a zinc salt and a cobalt salt.

Preferably, the electrolytic bath of the embodiment has a temperature of from 20 to 40° C., a pH of from 2 to 4 and a cathode density of from 10 to 40 $A/dm^2$.

In a third aspect, the present invention relates to a reinforcing structure for manufactured products made of vulcanized elastomeric material, this structure comprising a plurality of cords each composed of a plurality of surface-treated steel wires, characterized in that the said wires are coated with an alloy ZnMoX in which X is a metal chosen from the group comprising cobalt, iron and nickel.

In a fourth aspect, the present invention relates to a manufactured product made of vulcanized elastomeric material, comprising a steel component and/or a reinforcing structure, characterized in that the said component is coated with an alloy ZnMoX in which X is a metal chosen from the group comprising cobalt, iron and nickel.

Typically, said article is a tire, a conveyor belt, a trasmission belt or a flexilble hose.

Further, it has been surprisingly found that a steel component surface-coated with a ZnMoX alloy of the present invention has a better adhesion to the vulcanized elastomeric matrix than a steel wire coated with brass when said vulcanized elastomeric matrix comprises a suitable adhesion promoter corresponding to at least 0.2% by weight of bivalent cobalt metal with respect to the weight of the elastomeric material.

Therefore, in a further aspect this invention provides an article of manufacture comprising at least one metal component buried in a vulcanized elastomeric matrix obtained from a mixture comprising at least one vulcanizible elastomer and at least one vulcanizing agent consisting of sulphur or a derivative thereof, characterized in that said metal component is made of steel coated with a Zn/Mo/X alloy wherein X is a metal selected from the group comprising cobalt, iron and nickel, and that said mixture further comprises a salt of bivalent cobalt in an amount corresponding to at least 0.2% by weight of bivalent cobalt metal with respect to the weight of said elastomer.

Preferably, the amount of said salt of bivalent cobalt corresponds to an amount of bivalent cobalt metal of from 0.2 to 1% by weight with respect to the weight of said elastomer.

Preferably, said salt of bivalent cobalt is selected from the group comprising carboxylate compounds of formula (I)

(R—CO—O)$_2$Co     (I)

wherein R is a $C_{6-24}$ aliphatic or aromatic group, cobalt-boron complexes of formula (II)

(II)

wherein R', R" and R'", equal or different each other, are a $C_{6-24}$ aliphatic or aromatic group, and mixture thereof.

Preferred examples of R—CO—O—, R'—CO—O—, R"—CO—O— and R'"—CO—O— are those selected from the group comprising n-heptanoate, 2,2-dimethyl pentanoate, 2-ethyl-pentanotate, 4,4-dimethyl-pentanoate, 2-ethyl-esanoate, n-octanoate, 2,2-dimethyl-esanoate, neo-decanoate and naphthenate.

A preferred example of a salt of formula (I) is cobalt neodecanoate.

A preferred example of a salt of formula (II) is cobalt-boron 2-ethyl-esanoate-neodecanoate.

Typically, the mixture may further comprise other conventional ingredients such as, for example, silica, resorcin and hexamethoxymethylamine.

The present invention is further illustrated by the following Examples and Figures which are intended to illustrate the present invention without limiting it in any way.

Figure 1:
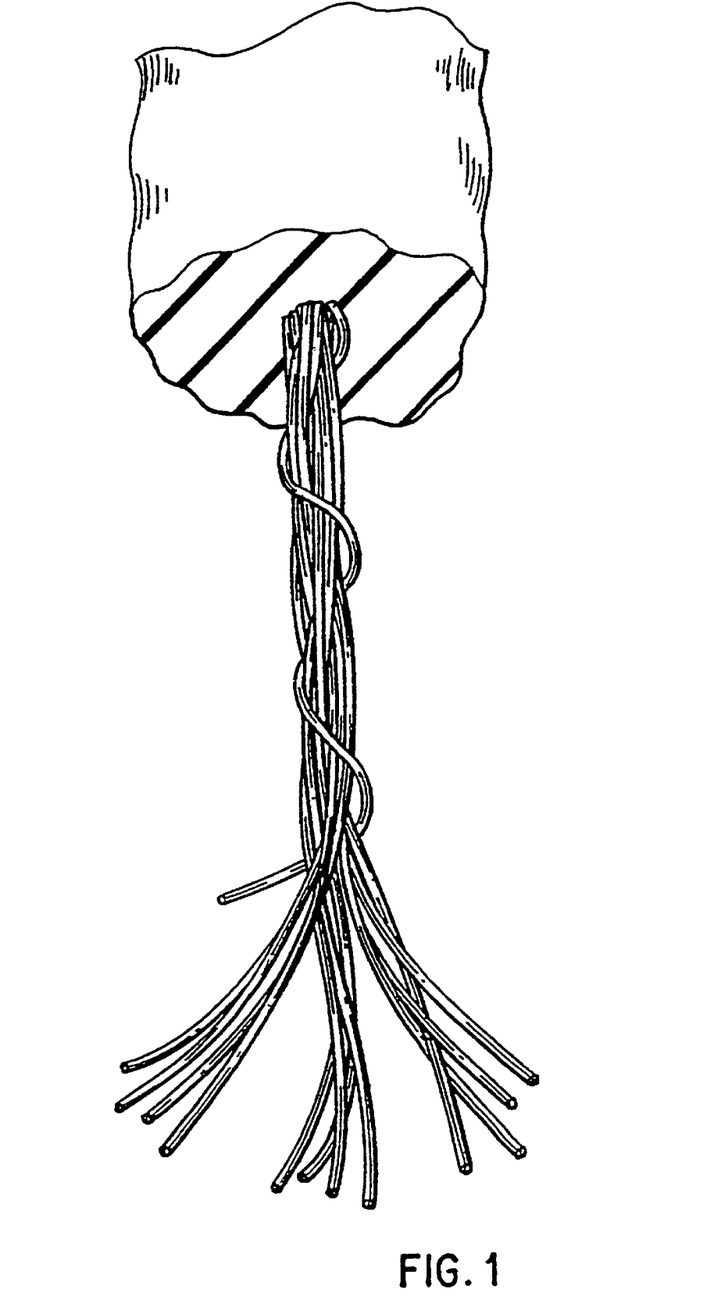
FIG. 1 shows a wire cord of the present invention buried in a vulcanized elastomeric matrix.
Figure 2:
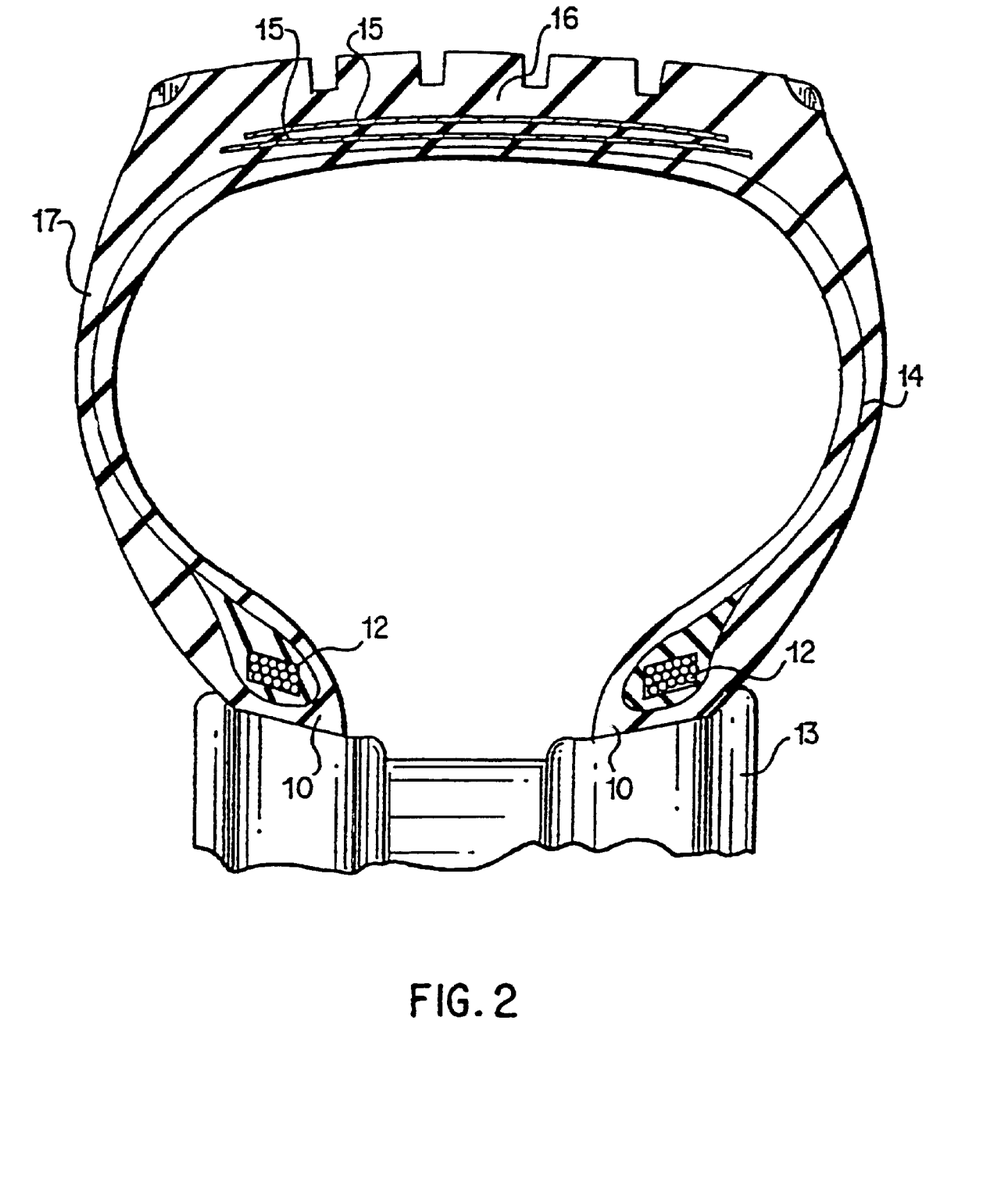
FIG. 2 is a sectional view of a tire in accordance with the invention.

In particular, FIG. 2 shows a tire made of a vulcanized elastomeric matrix and a reinforcing structure comprising at least one steel component coated with a layer of a ZnMoX alloy as above defined. In a preferred embodiment, the vulcanized elastomeric matrix of said tire is obtained from a mixture comprising at least one vulcanizible elastomer, at least one vulcanizing agent consisting of sulphur or a derivative thereof, and a salt of bivalent cobalt selected from the group comprising cobalt-boron 2-ethyl-esanoate-neodecanoate and cobalt neodecanoate according to the present invention.

Said tire is mounted on a rim 13, and is composed of: bead 10, bead core 12, carcass ply 14, belt 15, tread 16 and sidewalls 17. The belts 15 are made of cords of steel wire coated with a layer of a ZnMoX alloy as above defined.

Figure 3:
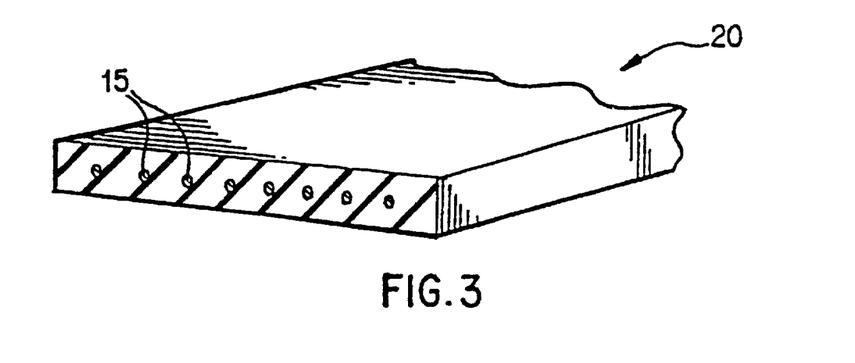
FIG. 3 is a perspective view in section of a conveyor belt in accordance with the invention.
Figure 4:
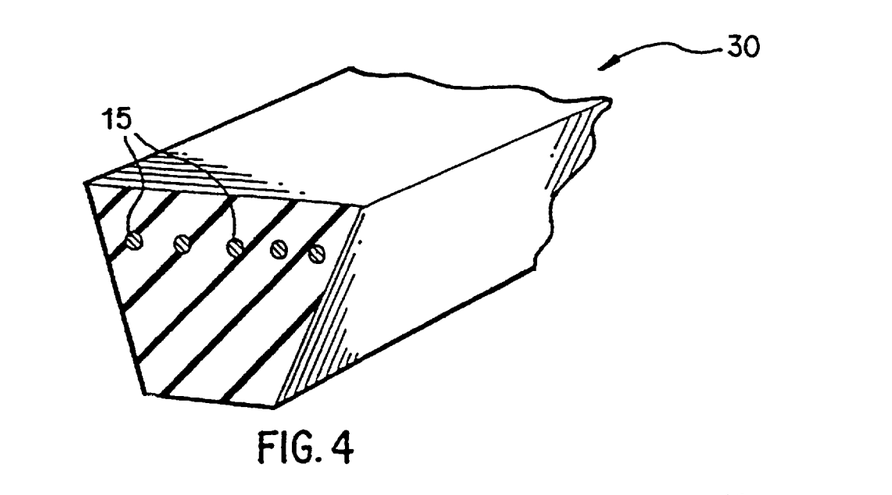
FIG. 4 is a perspective view in section of a transmission belt in accordance with the invention.
Figure 5:
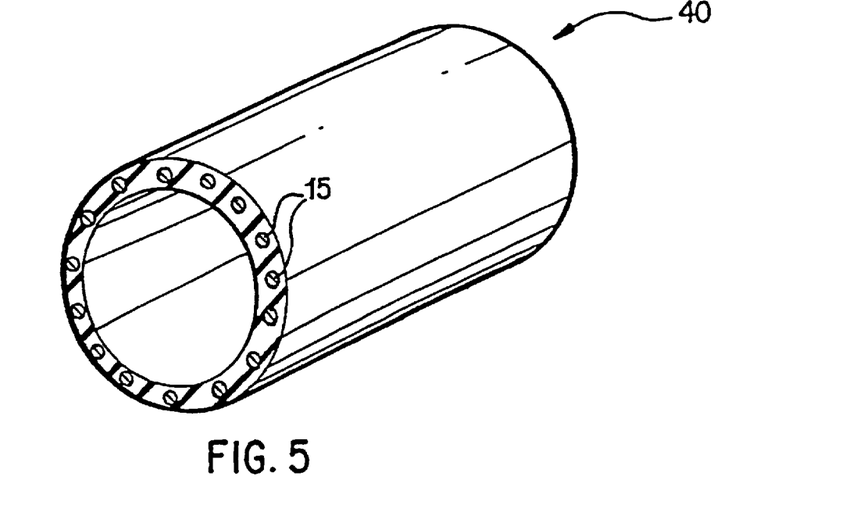
FIG. 5 is a perspective view in section of a flexible hose in accordance with the invention.

In turn, FIGS. 3 through 5 show a conveyor belt 20, a transmission belt 30 and a flexible hose 40, respectively, each of which is made of a vulcanized elastomeric matrix reinforced by cords 15 made of steel wires coated with a layer of ZnMoX alloy as above defined. Preferably, in each of said articles the vulcanized elastomeric matrix is obtained from a mixture comprising at least one vulcanizible elastomer, at least one vulcanizing agent consisting of sulphur or a derivative thereof, and a salt of bivalent cobalt selected from the group comprising cobalt-boron 2-ethyl-esanoate-neodecanoate and cobalt neodecanoate according to the present invention.

In the following Examples the abbreviation 3×4×0.22 means a cord made of 3 strands, each of them made of 4 wires of 0.22 mm in diameter.

Other abbreviations used in the examples have the following meanings:
N. R.=natural rubber,
C. B.=carbon black,
HMMM=hexamethoxymethylmelamine
DCBS=N,N'-dicyclohexyl-2-benzothiazylsulphenamide.

The amounts of the components of the vulcanizable mixtures exemplified are expressed in parts by weight.

The examples which follow serve to illustrate the present invention without, however, limiting it in any way.

EXAMPLE 1

Deposition of the Alloy

A galvanic bath, capable of depositing on a steel wire a layer of a zinc/cobalt/molybdenum ternary alloy consisting of 99.9% by weight of zinc, 0.05% by weight of cobalt and 0.05% by weight of molybdenum, has the following composition:

| | |
|---|---|
| $Zn^{++}$ | 1.91 mol/liter |
| $Co^{++}$ | 0.10 mol/liter |
| $Mo^{++}$ | 0.002 mol/liter |
| $Mg^{++}$ | 0.20 mol/liter |

The starting materials used to prepare the abovementioned bath were:

| | |
|---|---|
| zinc sulphate heptahydrate | 550 grams/liter |
| cobalt sulphate heptahydrate | 30 grams/liter |
| $(NH_4)_6Mo_7O_{24} \cdot 4H_2O$ | 0.35 gram/liter |
| magnesium sulphate heptahydrate | 50 grams/liter |

The operating conditions were:

| | |
|---|---|
| bath temperature | 25° C. |
| bath pH | 2 |
| cathode current density (zinc anodes) | 25 A/dm² |
| throughput speed of the wire | 18 m/min |

A layer of Zn/Co/Mo ternary alloy 1.5 microns thick was thus obtained.

Working in a similar manner, but replacing the cobalt salt with a suitable iron or nickel salt, coatings of similar thickness can be obtained, consisting of a Zn/Fe/Mo or Zn/Ni/Mo ternary alloy, respectively.

EXAMPLE 2

Deposition of the Alloy

A galvanic bath, capable of depositing on a steel wire a layer of a zinc/cobalt/molybdenum ternary alloy consisting of 95% by weight of zinc, 2% by weight of cobalt and 3% by weight of molybdenum, has the following composition:

| | |
|---|---|
| $Zn^{++}$ | 1.565 mol/liter |
| $Co^{++}$ | 0.43 mol/liter |
| $Mo^{++}$ | 0.0085 mol/liter |
| $Mg^{++}$ | 0.20 mol/liter |

The starting materials used to prepare the abovementioned bath were:
zinc sulphate heptahydrate 450 grams/liter
cobalt sulphate heptahydrate 120 grams/liter
$(NH_4)_6Mo_7O_{24} \cdot 4H_2O$ 1.25 grams/liter
magnesium sulphate heptahydrate 50 grams/liter The operating conditions were:

| | |
|---|---|
| bath temperature | 35° C. |
| bath pH | 2 |
| cathode current density (zinc anodes) | 35 A/dm² |
| throughput speed of the wire | 25 m/min |

A layer of Zn/Co/Mo ternary alloy 2 microns thick was thus obtained. Working in a similar manner, but replacing the cobalt salt with a suitable iron or nickel salt, coatings of similar thickness can be obtained, consisting of a Zn/Fe/Mo or Zn/Ni/Mo ternary alloy, respectively.

EXAMPLE 3

Derosition of the Alloy

A galvanic bath, capable of depositing on a steel wire a layer of a zinc/cobalt/molybdenum ternary alloy consisting of 99.1% by weight of zinc, 0.5% by weight of cobalt and 0.4% by weight of molybdenum, has the following composition:

| | |
|---|---|
| $Zn^{++}$ | 1.91 mol/liter |
| $Co^{++}$ | 0.43 mol/liter |

-continued

| | |
|---|---|
| $Mo^{++}$ | 0.004 mol/liter |
| $Mg^{++}$ | 0.20 mol/liter |

The starting materials used to prepare the abovementioned bath were:

| | |
|---|---|
| zinc sulphate heptahydrate | 550 grams/liter |
| cobalt sulphate heptahydrate | 120 grams/liter |
| $(NH_4)_6Mo_7O_{24}.4H_2O$ | 0.75 gram/liter |
| magnesium sulphate heptahydrate | 50 grams/liter |

The operating conditions were:

| | |
|---|---|
| bath temperature | 25° C. |
| bath pH | 2 |
| cathode current density (zinc anodes) | 35 A/dm$^2$ |
| throughput speed of the wire | 36 m/min |

A layer of Zn/Co/Mo ternary alloy 2 microns thick was thus obtained. Working in a similar manner, but replacing the cobalt salt with a suitable iron or nickel salt, coatings of similar thickness can be obtained, consisting of a Zn/Fe/Mo or Zn/Ni/Mo ternary alloy, respectively.

EXAMPLE 4

Corrosion Resistance

The corrosion resistance was determined by measuring the time required to initiate the formation of rust and of zinc oxide on a steel wire (1.30 mm in diameter) coated according to the invention, immersed in an aqueous 4% NaCl solution at 25° C.

The coating had the following composition:

wire A: 99.1% of zinc, 0.5% of cobalt and 0.4% of molybdenum.

The results are given in Table 1.

TABLE 1

| Coating | Time for formation of 90% of ZnO (hours) | Time for formation of 5% rust (hours) |
|---|---|---|
| A | 29 | 59 |

COMPARATIVE EXAMPLE 1

Corrosion Resistance

The process was performed as in Example 4 above, except that the test was carried out on five steel wires (1.30 mm in diameter) coated according to the prior art.

The coatings had the following compositions:
wire B: 99.5% of zinc and 0.5% of manganese;
wire C: 97.5% of zinc and 2.5% of manganese;
wire D: 60% of zinc and 40% of manganese;
wire E: 99.5% of zinc and 0.5% of cobalt;
wire F: 67% of copper and 33% of zinc (brass).

The results are given in Table 2.

TABLE 2

| Coating | Time for formation of 90% of ZnO (hours) | Time for formation of 5% rust (hours) |
|---|---|---|
| B | 6 | 38 |
| C | 15 | 20 |
| D | 29 | 38 |
| E | 2 | 35 |
| F | — | 1 |

EXAMPLE 5

Adhesion to the Vulcanized Elastomeric Material

The adhesion to the vulcanized elastomeric material was measured on test pieces of vulcanized mixture on a steel strand of the invention (made up of 4 wires 0.22 mm in diameter) by the method described in "Kautschk und Gummi Kunststoffe", 5, 228–232 (1969), which measures the force required to pull a cord out of a cylinder of vulcanized rubber.

The "pull-out force" was measured in Newtons using an electronic dynamometer. The values were measured both on freshly prepared vulcanized test pieces and on test pieces after age-hardening for one week at a temperature of 65° C. and at 90% relative humidity (R. H.).

The composition of the mixture which formed the vulcanized rubber was, in parts % by weight, as follows:

| | |
|---|---|
| natural rubber | 100 |
| ZnO | 8 |
| divalent cobalt | 0.2 |
| carbon black | 50 |
| silica | 10 |
| resorcinol | 3 |
| hexamethoxymethylenemelamine | 2.4 |
| dicyclohexylbenzothiazolesulphenamide | 1.1 |
| sulphur | 4 |
| trimercaptotriazine | 0.5 |

The results are shown in Table 3.

TABLE 3

| ZnCoMo coating | Initial pull-out force (N) | ±SD (N) | End pull-out force (N) | ±SD (N) |
|---|---|---|---|---|
| Co = 0.5% Mo = 0.4% | 680 | 26 | 650 | 30 |

SD = standard deviation.

Comparative Example 2

Adhesion to the Vulcanized Elastomeric Material

The process was performed in a similar manner to that of Example 5 above, except that test pieces of mixture, having the abovementioned composition, vulcanized on two steel strands of the prior art (each made up of 4 wires 0.22 mm in diameter) were used.

The results are shown in Table 4.

TABLE 4

| Coating | Initial pull-out force (N) | ±SD (N) | End pull-out force (N) | ±SD (N) |
|---|---|---|---|---|
| brass* | 680 | 27 | 600 | 29 |
| ZnCo** | 600 | 22 | 570 | 31 |

SD = standard deviation
*CU = 67% and Zn = 33%;
**Zn = 99.5% and Co = 0.5%.

EXAMPLE 6

Drawability

A steel wire (1.30 mm in diameter), coated according to the invention, was drawn to a final diameter of 0.22 mm at a speed of 20 m/sec in a device of the HT 18 type from the company Herborn.

The number of meters of wire produced before the dies needed to be replaced were thus measured. The weight percentage of loss of Zn/Co/Mo alloy deposited was also measured.

Table 5 shows the results obtained.

TABLE 5

| Zn/Co/Mo coating | meters of wire produced × $10^3$ | loss of Zn/Co/Mo alloy deposited (%) |
|---|---|---|
| Co = 0.5% Mo = 0.4% | 2000 | 10 |

Comparative Example 3

Drawability

The process was performed in a similar manner to that of Example 6 above, except that two steel wires of the prior art were drawn.

Table 6 shows the results obtained.

TABLE 6

| Coating | meters of wire produced × $10^3$ | loss of Zn/Co/Mo alloy deposited (%) |
|---|---|---|
| brass * | 2000 | 12 |
| ZnCo ** | 1000 | 15 |

* Cu = 67% and Zn = 33%;
** Zn = 99.5% and Co = 0.5%.

EXAMPLE 7

Vulcanized Elastomeric Material

Cylindrical test samples were prepared by burying steel wire cords (3×4×0.22) coated with a ZnCoMo alloy layer (comprising 0.5% of Co and 0.4% of Mo) having 0.20 micron thick, in a mixture having the composition shown herein below. The mixture was then vulcanized at 151° C. for 40 minutes.

The burial length of the cords in the test samples was 12 mm.

| Ingredients | (p/p) % |
|---|---|
| N.R. | 100 |
| ZnO | 5 |
| C.B. | 42 |
| silica | 13 |
| aromatic oil | 5 |
| $Co^{++}$ | $0.2^{a)}$ |
| resorcin | 2.5 |
| HMMM | 3.3 |
| DCBS | 0.8 |
| sulphur | 5 |
| protective agents | 3 |

[a] = as boron-cobalt 2-ethylhexanoate-neodecanoate.

EXAMPLE 8

Adhesion to Vulcanized Elastomeric Material

Adhesion was measured in a similar manner to that of Example 5 above, except that the test samples were prepared as described in the—Example 7 above.

The pull out force was measured in Newtons with an electronic dynamometer.

The coating degree of the cords extracted from each test sample was graded according to a coating index ranking from 1 to 4 depending on the percent of the cord surface which was still well coated by elastomeric material.

Initial adhesion values (Test I) and the adhesion values measured after having kept the test samples in a climatic room at 65° C. and 90% R. H. for 8 days (Test II) are shown in the following Table 7 where the first number is the adhesion value, as an average on 8 tests, while the index in brackets is the coating degree of the cords.

TABLE 7

| 3 × 4 × 0.22 Cord[*] | |
|---|---|
| Test I | 646 (4) |
| Test II | 636 (3.5) |

[*] made of wires coated with Zn/Co/Mo alloy wherein Co content was 0.5% and Mo content was 0.4%.

I claim:

1. Surface-treated metal component for reinforcing structures for manufactured products made of vulcanized elastomeric material, in which the said component is coated with a layer of metal alloy and is characterized in that the said alloy is ZnMoX in which X is a metal selected from the group consisting of cobalt, iron and nickel.

2. Metal component according to claim 1, characterized in that the said alloy has an Mo content of from 0.05 to 3% by weight.

3. Metal alloy according to claim 2, characterized in that the said alloy has an Mo content of from 0.1 to 1% by weight.

4. Metal component according to claim 1, characterized in that the said alloy has a Zn content of from 95 to 99.9% by weight.

5. Metal component according to claim 4, characterized in that the said alloy has a Zn content of from 98 to 99.5% by weight.

6. Metal component according to claim 1, characterized in that the said alloy has a content of metal X of from 0.05 to 2% by weight.

7. Metal component according to claim 6, characterized in that the said alloy has a content of metal X of from 0.1 to 1% by weight.

8. Metal component according to claim 1, characterized in that the said surface coating layer is formed by electrodeposition on the surface of the said steel wire.

9. Reinforcing structure for manufactured products made of vulcanized elastomeric material, comprising a plurality of cords each composed of a plurality of surface-treated steel wires, characterized in that the said wires are coated with an alloy ZnMoX in which X is a metal selected from the group consisting of cobalt, iron and nickel according to any one of claims 1 to 8.

10. Manufactured product made of vulcanized elastomeric material, comprising a steel component and/or a reinforcing structure, characterized in that the said component is coated with an alloy ZnMoX in which X is a metal selected from the group consisting of cobalt, iron and nickel according to any one of claims 1 to 8.

11. An article of manufacture comprising at least one metal wire buried in a vulcanized elastomeric matrix obtained from a mixture comprising at least one vulcanizible elastomer and at least one vulcanizing agent consisting of sulphur or a derivative thereof, characterized in that said metal component is made of steel coated with a ZnMoX alloy in which X is a metal selected from the group consisting of cobalt, iron and nickel according to any one of claims 1 to 8, and that said mixture further comprises a salt of bivalent cobalt in an amount corresponding to at least 0.2% by weight of bivalent cobalt metal with respect to the weight of said elastomer.

12. An article of manufacture according to claim 11, characterized in that the amount of said salt of bivalent cobalt corresponds to an amount of bivilent cobalt metal of from 0.2 to 1% by weight with respect to the weight of said elastomer.

13. An article of manufacture according to claim 11, wherein said salt of bivalent cobalt is selected from the group consisting of a carboxylate of formula (I)

(R—CO—O)$_2$Co       (I)

wherein R is a $C_{6-24}$ aliphatic or aromatic group,
a cobalt-boron complex of formula (II)

(II)

wherein R', R" and R'", are equal or different from each other, and are a $C_{6-24}$ aliphatic or aromatic group, or mixture thereof.

14. An article of manufacture according to claim 13, wherein R—CO—O—, R'—CO—O—, R"—CO—O— and R'"—CO—O— are selected from the group consisting of n-heptanoate, 2,2-dimethylpentanoate, 2-ethyl-pentanotate, 4,4-dimethyl-pentanoate, 2-ethyl-esanoate, n-octanoate, 2,2-dimethyl-esanoate, neodecanoate and naphthenate.

15. An article of manufacture according to claim 11, wherein said salt of bivalent cobalt of formula (I) is cobalt neodecanoate.

16. An article of manufacture according to claim 11, wherein said salt of bivalent cobalt of formula (II) is cobalt-boron 2-ethyl-esanoate-neodecanoate.

17. An article of manufacture according to claim 11, wherein said article is a tire, a conveyor belt, a transmission belt or a flexible hose.

18. A process for the electrolytic deposition of an alloy ZnMoX, in which X is a metal selected from the group consisting of cobalt, iron and nickel, onto a steel wire passing through an electrolytic bath, characterized in that the said steel wire is passed through an electrolytic bath consisting of an aqueous solution of at least one salt chosen from zinc and molybdenum salts, the said electrolytic bath having:

a temperature of from 20 to 50° C.;

pH of from 2 to 6; and a cathode density of from 10 to 50 A/dm$^2$.

19. A process according to claim 18, characterized in that the throughput speed of the said wire is from 10 to 70 m/min.

20. A process according to claim 19, characterized in that the throughput speed of the said wire is from 20 to 50 m/min.

21. A process according to claim 18, characterized in that the zinc salt is a sulphate.

22. A process according to claim 18, characterized in that the zinc sulphate is zinc sulphate heptahydrate.

23. A process according to claim 18, characterized in that the molybdenum salt is an ammoniacal complex.

24. A process according to claim 23, characterized in that the ammoniacal molybdenum complex is $(NH_4)_6Mo_7O_{24} \cdot 4H_2O$.

25. A process according to claim 18, characterized in that the steel wire is immersed in an electrolytic bath comprising a molybdenum salt, a zinc salt and a cobalt salt.

26. A process according to claim 25, characterized in that the electrolytic bath has a temperature of from 20 to 40° C., a pH of from 2 to 4 and a cathode density of from 10 to 40 A/dm$^2$.

* * * * *

UNITED STATES PATENT AND TRADEMARK OFFICE
CERTIFICATE OF CORRECTION

PATENT NO.   : 6,096,423
DATED        : August 1, 2000
INVENTOR(S)  : Pavan et al.

It is certified that error appears in the above-identified patent and that said Letters Patent is hereby corrected as shown below:

<u>Title page,</u>
Item [19], inventor's last name, change "Pavan" to -- Pavan et al. --.
Item [75], change "Inventor: Federico Pavan, Florence, Italy" to
-- Inventors: Federico Pavan, Florence, Italy and Giuseppina Ratti, Seregno, Italy --.

Signed and Sealed this

Twenty-third Day of April, 2002

*Attest:*

*Attesting Officer*

JAMES E. ROGAN
*Director of the United States Patent and Trademark Office*